(12) United States Patent
Ruelke et al.

(10) Patent No.: US 9,036,741 B2
(45) Date of Patent: May 19, 2015

(54) SYSTEMS, METHODS, AND DEVICES FOR FREQUENCY-SELECTIVE AGC

(71) Applicant: MOTOROLA SOLUTIONS, INC., Schaumburg, IL (US)

(72) Inventors: Charles R. Ruelke, Margate, FL (US); Yadybabdaba N. Rao, Sunrise, FL (US); Geetha K. Thampi, Sunrise, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 26 days.

(21) Appl. No.: 13/729,766

(22) Filed: Dec. 28, 2012

(65) Prior Publication Data

US 2014/0185711 A1 Jul. 3, 2014

(51) Int. Cl.
*H04L 27/06* (2006.01)
*H04L 27/26* (2006.01)
*H04B 1/00* (2006.01)
*H04B 1/12* (2006.01)

(52) U.S. Cl.
CPC ............ *H04L 27/2649* (2013.01); *H04B 1/005* (2013.01); *H04B 1/123* (2013.01)

(58) Field of Classification Search
CPC ......... H04B 7/12; H04L 1/04; H04L 27/2637
USPC ........................................................ 375/340
See application file for complete search history.

(56) References Cited

U.S. PATENT DOCUMENTS

| | | | |
|---|---|---|---|
| 6,259,315 B1 | 7/2001 | Mattisson et al. | |
| 7,707,617 B2 | 4/2010 | Birleson | |
| 8,239,579 B2 * | 8/2012 | Tang et al. | 709/248 |
| 2003/0099308 A1 | 5/2003 | Cao et al. | |
| 2006/0199587 A1 | 9/2006 | Hansen | |
| 2007/0117523 A1 | 5/2007 | Weber et al. | |
| 2008/0225182 A1 * | 9/2008 | Silver et al. | 348/726 |
| 2009/0111390 A1 * | 4/2009 | Sutton et al. | 455/77 |
| 2009/0253396 A1 | 10/2009 | Deguchi et al. | |
| 2012/0082271 A1 | 4/2012 | Elenes et al. | |
| 2012/0129480 A1 | 5/2012 | Ruelke et al. | |
| 2012/0142301 A1 * | 6/2012 | Rodal | 455/296 |

FOREIGN PATENT DOCUMENTS

WO 201205068 A2 4/2012
WO 2012050681 A2 4/2012

* cited by examiner

*Primary Examiner* — Tanmay Shah
(74) *Attorney, Agent, or Firm* — Barbara R. Doutre

(57) ABSTRACT

A wideband phase detector configured to receive an intermediate frequency (IF) signal having a plurality of information signals at predetermined carrier frequencies and to generate a carrier indication signal used to control one or more attenuators to equalize the signal levels of the information signals thereby enabling a multichannel receiver to process the two information signals in a parallel fashion using a common analog front-end and analog to digital conversion circuit. The circuit may include an attenuation controller configured to provide control signals to the one or more attenuators to attenuate one or more corresponding information signals based on an average of the carrier indication signal.

15 Claims, 13 Drawing Sheets

SYSTEMS, METHODS, AND DEVICES FOR FREQUENCY-SELECTIVE AGC

FIELD OF THE INVENTION

The field of the invention generally relates to improving signal quality in electronic devices. Particularly, the field of the invention relates to attenuating one or more information signals to improve signal quality of such information signals in a receiver.

BACKGROUND

The current state of the art of receivers for cellular applications and land-mobile radios include receiving a plurality of information signals across a wireless network, each information signal having a predetermined carrier frequency associated with a channel. Such receivers may be incorporated in handsets or base stations of cellular networks and demodulate information signals carrying voice and data information. Each information signal operates at a frequency that is associated with a channel. However, an information signal in one channel may negatively impact the demodulation of another information signal in a different channel when both signals are simultaneously processed within the receiver. One reason for the impact may be due to the information signal having a substantially larger magnitude may consume the dynamic range of an amplifier, an analog-to-digital converter, and/or other components within the receiver. In addition, during the demodulation of a desired information signal in a desired channel, a substantially larger (in magnitude) information signal may be mixed into the desired channel (e.g., through nonlinearities of the mixers, or through spur generation from an analog to digital converter, etc.) and cause interference with the desired information signal.

BRIEF DESCRIPTION OF THE SEVERAL VIEWS OF THE DRAWINGS

The accompanying drawings, which are incorporated in and constitute part of this specification, illustrate embodiments of the invention and together with the description serve to explain the principles of the present disclosure. The embodiments illustrated herein are presented as examples, it being understood, however, that the invention is not limited to the precise arrangements and instrumentalities shown, wherein.

DETAILED DESCRIPTION

The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

Figure 1:
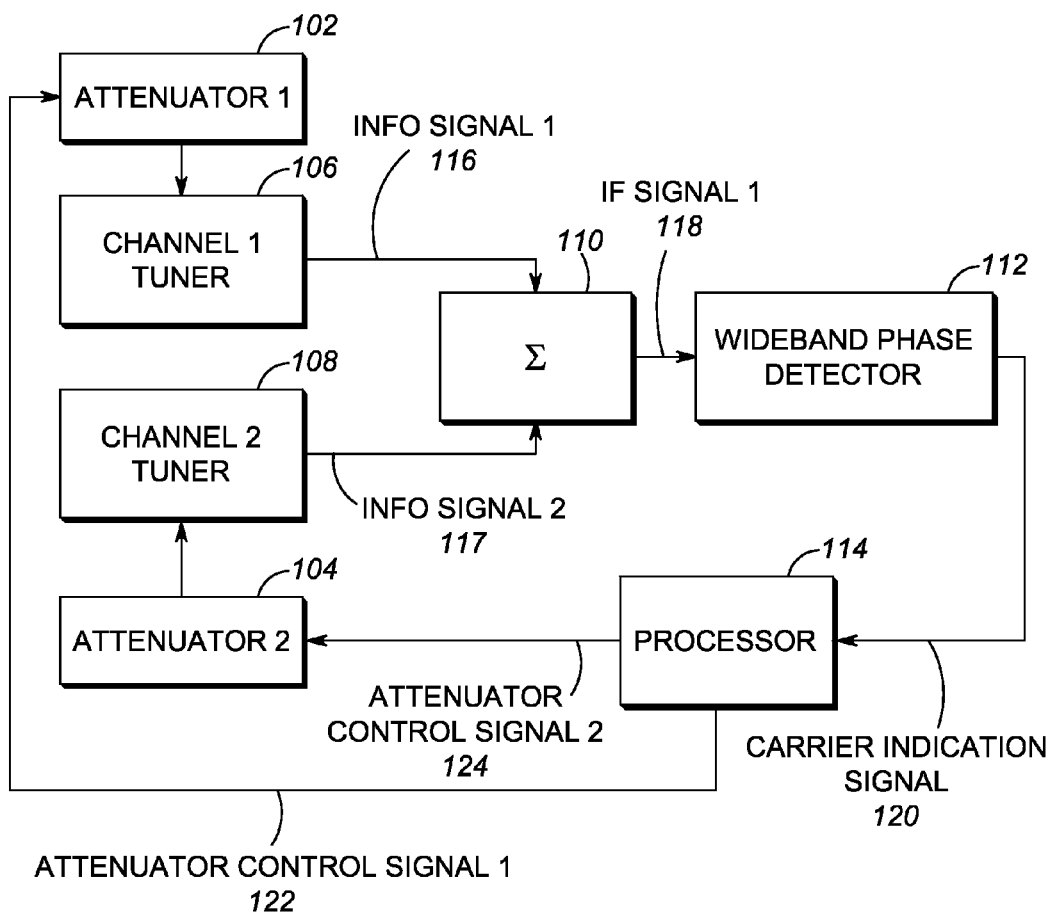
FIG. 1 is an example system for attenuating one or more information signals to improve reception in a receiver using a wideband phase detector.

FIG. 1 is an example system 100 for attenuating one or more information signals to improve signal quality in a receiver using a wideband phase detector. The receiver may be used, for example, in devices that need to simultaneously receive two more signals. Such receivers may be found in mobile handset devices, base station radio receivers, or other mobile or infrastructure devices, and be used to demodulate information signals that carry either voice or data information. Some embodiments may take the form of a Dual Watch (DW) simultaneous receiver system (SRS).

Each information signal operates at a carrier frequency in its own channel. The information signals may be located in adjacent channels, or they may be processed via channel tuners, or mixers, and placed in adjacent channels, such as within an intermediate frequency signal. The receiver may use various configurations of front end signal splitting to enable both in-band and cross-band simultaneous dual channel reception. However, an information signal in one channel may negatively impact the demodulation of another information signal in a different channel where the one information signal has a substantially larger magnitude than the information signal to be demodulated. During the demodulation of a desired information signal in a desired channel, the substantially larger (in magnitude) information signal may cause the receiver circuitry to adjust to accommodate the high magnitude signal, to the detriment of the lower magnitude signal. Specifically, a low-magnitude information signal may be negatively impacted by a receiver's noise floor, or by an ADC's quantization noise, if a relatively larger magnitude information signal is to be simultaneously accommodated without overdriving (e.g., clipping and other non-linear distortions) the receiver's components. In addition, interference signals proximate to the first desired channel may be mixed onto the second channel as co-channel interferers. Similarly, strong-to-weak signal operating conditions may exist where the far-out transmitter noise from the first desired DW channel is mixed into the second DW channel thereby deleteriously affecting the second DW channel's Signal-to-Noise Ratio (SNR);

For ease of explanation and illustration, the drawings and examples within this application are shown in the form of a dual-channel receiver, however it should be understood that the receiver can receive RF signals from more than two channels. Hence, the term multi-channel receiver is intended to encompass two or more channels. The receiver's tuners may operate over more than one band, such as multiple bands in the public safety band and can include any type of information, even uncorrelated information, such as voice and data over the different bands.

The receivers of some embodiments described herein operate within radios that comply with stringent public safety specifications, such as TETRA (TErrestrial Trunked RAdio), APCO P25 (Association of Public Safety Communications Officials Project 25) and/or Professional Commercial Radios (PCR) two-way radios for the public safety, government and enterprise customers worldwide. Some embodiments may take the form of a narrowband receiver, which is one considered to be operating within an RF frequency range of 100 MHz to 1200 MHz having channel spacing of less than 150 kHz, and typically 25 kHz, 20 khz, or 12.5 kHz channel spacing. The DW-SRS can adopt either a Direct Conversion Receiver topology (DCR) or a Dual Conversion topology; however, whether DCR or Dual Conversion, the receiver topology may include band specific receiver front end stages for isolating the desired first and second information signals as will be described subsequently herein. The DW-SRS will also have parallel operations in the Digital Signal Processing stage (DSP) so as to process both the first and second received signals simultaneously.

A receiver may use multi-channel architectures as depicted in example system 100 to determine an information signal with a substantially larger magnitude that can negatively impact a desired information signal. System 100 of FIG. 1 may be implemented as a dual watch simultaneous receiver system (DW-SRS) incorporating a dual conversion topology operating in accordance with the various embodiments. Receiver 100 may be part of a radio for use in public safety, government and enterprise environments as described previously.

The example system 100 includes a Channel 1 tuner 106 and a Channel 2 tuner 108. Further, each of the Channel 1 tuner 106 and Channel 2 tuner 108 receives one or more signals across a range of frequencies. Such one or more signals may include information signals that include voice or data information modulated onto a carrier wave, as is known in the art, and thus are to be demodulated by the receiver. Each of the Channel 1 tuner 106 and Channel 2 tuner 108 is tuned to a carrier frequency such that the output of the Channel 1 tuner 106 and Channel 2 tuner 108 is an information signal 1 (116) and an information signal 2 (117), respectively. Each of the tuners, in turn, outputs its respective downconverted signal to a respective predetermined carrier frequency with the IF bandwidth of the receiver. That is, the Channel 1 tuner 106 and the Channel 2 tuner 108 may include one or more filters, local oscillators, and mixers configured to generate downconverted information signals such as information signal 1 (116) and information signal 2 (117), where the oscillators and filters of each tuner are uniquely configured to down convert its desired channel to its respective predetermined carrier frequency, or center frequency, within the IF band. Thus, when the two (or more) information signals are combined at combiner 110, they are located at separate and distinct carrier frequencies, and form a composite wideband signal. Alternative embodiments may include additional tuner/attenuator circuits to accommodate multi-channel reception of three or more channels, with each tuner being assigned its own predetermined carrier/center frequency within the IF signal band.

Information signal 1 (116) and information signal 2 (117) are provided to a signal combiner 110 to provide an intermediate signal (IF) 118. The term intermediate signal is intended to include signals at or near baseband frequencies, as described further herein, as well as signals located in a higher frequency band. In this sense, the term "intermediate" refers to aspects of the receiver architecture where the combined information signals will be further processed as described herein. Further, a wideband phase detector 112 is configured to receive the IF signal 118 having the plurality of information signals (116 and 117) at predetermined carrier frequencies and to generate a carrier indication signal 120. The wideband phase detector 112 is a phase detector that operates on the composite wideband signal that includes two separate information signals at two separate carrier frequencies. Examples of a wideband phase detector may include an FM demodulator, examples of which may include quadrature detectors, phase-locked loop (PLL)-based detectors, Coordinate Rotation Digital Computer (CORDIC) demodulators, discriminators, ratio detectors, etc.

The wideband phase detector 112 exhibits an FM-capture effect that produces an output representative of the phase information, or function of the phase, of the combined wideband signal. In doing so, the wideband phase detector operates to identify the information signal having the highest magnitude from among the plurality of information signals fed into it. To examine this effect, consider one example of such a detector in the form of a limiter-discriminator, where the detector circuit induces nonlinear distortion by amplifying and then peak-limiting the combined information signals. The signal zero crossings are then evaluated and counted to determine the frequency of the signal. The detector output may be an analog or digital signal representation of the zero-crossing count.

In a scenario with a first information signal (at a first carrier frequency) having significantly higher magnitude than a second information signal (at a second carrier frequency), the contribution to the overall signal amplitude variations made by the second information signal (including both its carrier wave and its modulated data) will be minimal, and hence will not contribute significantly to the number of zero crossings. Note that the location of the zero crossings is determined primarily by the phase of the signal, and the number of zero crossings is representative of the frequency. In this sense, the output of the detector may be characterized as phase information, or as a function of phase information. Thus, through the operation of the amplification and limiting circuits, the output will primarily reflect the frequency of the carrier of the larger magnitude information signal. Further, because the tuners are configured to place the information signals at known, or predetermined, carrier locations within the IF signal, the identity of the larger magnitude signal is discernible from the detector output, where the output value will have a steady-state, or DC value associated with one or the other of the predetermined carrier frequencies (or, more generally, with one of a plurality of predetermined carrier frequencies). In some embodiments, the detector output may be averaged to eliminate instantaneous fluctuations, and to allow the detector to converge to a value. Averaging will also reduce or eliminate frequency fluctuations associated with the modulated information contained in the higher-magnitude information signal, as well as fluctuations caused by the lower-magnitude information signal. The detector output may thus be used to identify the information signal that is of significantly larger magnitude, and enable the receiver to appropriately attenuate that information signal.

In another example, using a PLL detector, the instantaneous phase error used to adjust the PLL oscillator will be dominated by the carrier associated with higher magnitude information signal. The information signals having significantly lower magnitude will cause either low frequency or high frequency variations in the phase error (depending on its carrier frequency relative to the carrier frequency of the high-magnitude information signal), but the small magnitude of these variations will contribute relatively little to the overall average phase error, and the PLL will converge to the frequency of the carrier of the larger magnitude information signal. On the other hand, in scenarios where the information signals are more closely matched, each signal may have significant impact on the wideband detector output. The modulated information as well as the carriers of both of the information signals will more likely all contribute to zero-crossings, phase errors, or the respective measure used by the particular detector structure. In this case, the detector output will converge to an intermediate value not associated with one of the predetermined carrier frequencies. In this scenario, the detector output will indicate that the information signals are of sufficiently equal magnitude and no adjustment (or further adjustment) needs to be made to the information signal magnitudes. It is understood that the particular parameter values of the receiver design may be adjusted according to the needs of the receiver. The size of the attenuation steps, the location of the predetermined carrier frequencies, the corresponding carrier strength signal averages (i.e., DC offsets), the bandwidth and location of the intermediate frequency band (including direct conversion to baseband) are all adjustable, and particular values are not important. Further, the measure of substantial similarity of information signal magnitudes is a matter of degree, and can be adjusted such that the signals will be deemed to be substantially similar when they are able to be processed in a simultaneous fashion without undue degradation caused by quantization or noise interference associated with or imposed by the other information signals. In some embodiments of a particular receiver, when the signals are within approximately 10 dB of each other, they are able to be processed with acceptable signal to noise ratios.

A processor 114 receives and averages the carrier indication signal 120. The processor may take the form of a microcontroller, a digital signal processor, a general purpose CPU, an ASIC, FPGA, or the like. Further, the processor 114 may also include an attenuation controller configured to provide control signals to the one or more attenuators to attenuate one or more corresponding information signals based on an average of the carrier indication signal. For example, processor 114 provides an attenuation control signal 1 (122) to attenuator 1 (102) such that attenuator 1 (102) may attenuate information signal 1 (116). Further, processor 114 provides an attenuation control signal 2 (124) to attenuator 2 (104) such that attenuator 2 (104) may attenuate information signal 2 (117).

Due to the nature of the wideband phase detector as described above, the average value of the carrier strength signal 120 may be associated with the carrier frequency of information signal 1 (116). Alternatively, the average value of the carrier strength signal may be associated with the carrier frequency of information signal 2 (117). That is, the average value or DC offset of the time-varying carrier strength signal may be associated with a carrier frequency (including down conversion and oscillator offset netting errors) of information signal 1 (116) or information signal 2 (117).

Some embodiments include the processor 114 or attenuation controller configured to determine an average of the carrier indication signal and provide a control signal to a selected attenuator to gradually increase an attenuation level, the selected attenuator determined based on the average of the carrier indication signal. Further, the processor 114 or attenuation controller is configured to detect a change in the average of the carrier indication signal and responsively set the attenuation level. In one example, when the wideband detector output indicates a value associated with a first predetermined carrier frequency, the processor 114 or attenuation controller may attenuate the information signal at that predetermined carrier frequency. The attenuation level may gradually be increased until the average of the carrier indication signal diverges from the first predetermined carrier frequency. In some embodiments, the attenuation may be adjusted until the average of the carrier indication signal changes to a value associated with another predetermined carrier frequency, or in other embodiments, the attenuation may be adjusted until the carrier indication signal converges to an intermediate value.

In alternate embodiments, the processor 114 or attenuation controller is configured to determine an average of the carrier indication signal and a variance of the carrier indication signal. The variance of the carrier indication signal is indicative of the relative magnitude of one of the plurality of information signals with respect to the other.

Further, the processor 114 or attenuation controller may determine if the variance is below a threshold and responsively provide a control signal (e.g., attenuator control signal 1 (122)) to increase attenuation of an attenuator if the average value is associated with the frequency of information signal 1 (116) or provide a control signal (e.g., attenuator control signal 2 (124)) to increase attenuation of a second attenuator if the average is associated with the frequency of information signal 2 (117). In other embodiments, the processor 114 may provide a control signal (122 and 124) to a selected attenuator (102 and 104) to increase an attenuation level at a predetermined rate. Further, the selected attenuator and rate of change may be determined based on the carrier indication signal. The average of the carrier indication signal may indicate which attenuator is selected, and its variance may determine the rate of change. In some embodiments, a higher rate of change may be used when the variance is low, or below a threshold. The rate may then be decreased as the variance increases, or when it is above the threshold.

Figure 2:
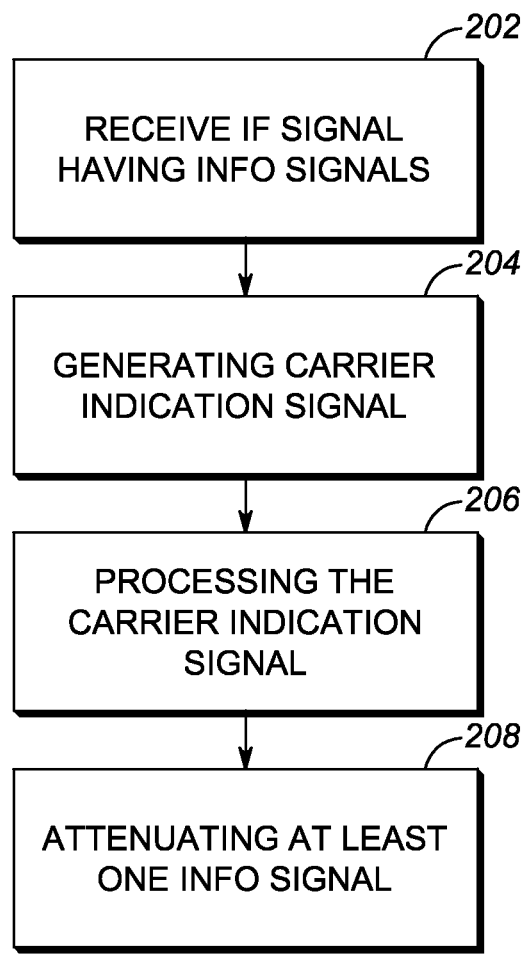
FIG. 2 is an example flowchart for an example method attenuating one or more information signals to improve signal quality in a receiver using a wideband phase detector.

In embodiments that utilize a variance measurement, the variance may be used to determine the degree to which the larger magnitude information signal is greater than the other information signal(s). That is, the variance of the carrier indication signal is indicative of the relative magnitude of one of the plurality of information signals with respect to the other. That is, in situations where the largest magnitude information signal greatly exceeds the others, the fluctuations in the carrier indication signal will be relatively small. As the information signals approach the same magnitude, the average of the carrier strength indications signal may remain stable while the deviation or variance may increase. The amount of deviation or variance may be measured and compared to a threshold. The variance may be measured in a traditional statistical calculation based on an average squared deviation, or simply an average of the absolute value of the deviation, or other estimates that provide measures of variance. FIG. 2 is an example flowchart for an example method 200 attenuating one or more information signals to improve signal quality in a receiver using a wideband phase detector. The example method 200 includes receiving an intermediate frequency (IF) signal having two or more information signals at predetermined carrier frequencies by a wideband phase detector, as shown in block 202. A channel tuner may provide the information signals to a signal combiner that provides the IF signal to the wideband phase detector. The example method 200 may further include generating a carrier indication signal by processing the IF signal by the wideband phase detector, as shown in block 204. In alternate embodiments, the carrier indication signal is generated by the wideband phase detector operating on a sampled version of the IF signal. Further, an example of a wideband phase detector may be an FM-capture demodulator such as a coordinate rotation digital computer (CORDIC) demodulator.

In addition, the example method 200 may include processing the carrier indication signal by a processor or attenuation controller, as shown in block 206. The processing of block 206 may include one or more of averaging the carrier indication signal, detecting a change in the average of the carrier indication signal, calculating a variance of the carrier indication signal, calculating a filtered version of the carrier indication signal, etc. Also, the example method 200 may include attenuating at least one of the information signals based on the processed carrier indication signal, as shown in block 208. Such attenuation may occur by providing an attenuation control signal by the processor or attenuation controller to one of a plurality of attenuators coupled to a tuner or receiver front-end that retrieves the corresponding information signal. In other embodiments, the processor or attenuation controller may provide a control signal to a selected attenuator to increase an attenuation level at a predetermined rate. Further, the selected attenuator and rate of change may be determined based on the carrier indication signal.

Alternative embodiments of the example method may include iteratively determining the average of the carrier indication signal and attenuating the information signals until the magnitudes of the information signals are substantially similar. In one embodiment the iterations include adjusting the attenuator associated with the highest magnitude information signal and then re-examining the carrier indication signal for changes indicating that the information signals are of substantially equal magnitude. In other embodiments involving three or more information signals, the information signals may be examined in a pairwise fashion by the wideband phase detector to ensure that the information signals are all of substantially similar magnitudes. In this embodiment, the processor 114 may be configured to control attenuators associated with each of the information signals to selectively eliminate certain ones of them from the intermediate frequency signal during the pairwise analysis.

Further embodiments may include that the attenuation of the information signals is also based on a second signal. Such a second signal may be a variance of the carrier indication signal as described above, or a phase-spike filter output as discussed when describing FIGS. 4-5. Additional embodiments may include a state machine that processes the average of the carrier indication signal and the second signal. In such embodiments, the average of the carrier indication signal indicates a magnitude of one of the information signals and the variance of the carrier indication signal indicates the relative magnitude of another of the information signals.

Figure 3:
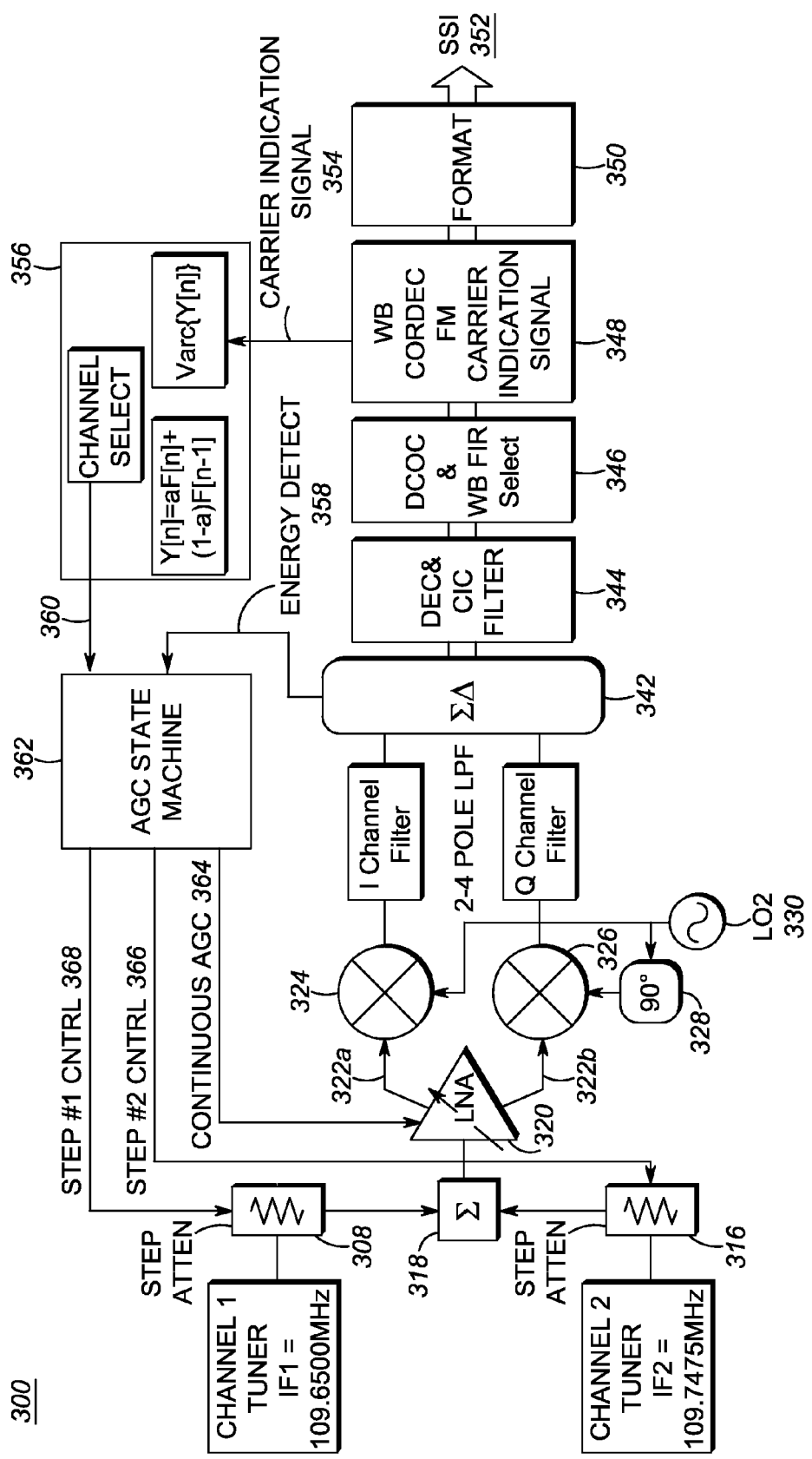
FIG. 3 is an example system for attenuating one or more information signals to improve signal quality in a receiver.

FIG. 3 is an example system 300 for attenuating one or more information signals to improve signal quality in a receiver. The receiver may be used, for example, in radio frequency applications such as mobile radios, cell phones, base stations, etc., to demodulate multiples information signals that carry either voice or data information. Such an example system 300 includes two channel tuners each including a preselector, low-noise amplifier (LNA), and a mixer. Each channel tuner receives multiple information signals across a range of frequencies. Further, each channel tuner is tuned accordingly to provide an information signal at a selected or predetermined carrier frequency. For example, channel 1 tuner provides an information signal at 109.65 MHz and channel 2 tuner provides an information signal at 109.7475 MHz. Note that these frequencies are approximately 100 KHz apart. Further, each channel tuner is coupled to a step attenuator (308 and 316). In addition, each channel tuner provides their respective information signal to a signal combiner 318.

The signal combiner generates an intermediate frequency (IF) signal that includes the information signals selected by the channel tuners. Such an IF signal is amplified by a low-noise amplifier 320 and the amplified signals (322a and 322b) are provided to two different mixers (324 and 326). The local oscillator 330 provides a signal to each mixer (324 and 326) that are out of phase by 90 degrees 328. The in-phase mixed signal follows an I Channel and the out-of-phase mixed signal follows a Q Channel. Each of the I and Q channel filters may include an amplifier, low pass filter and a buffer.

Each signal from the I Channel and Q Channel is sampled by an analog-to-digital converter 342. The sampled signal is filtered by two digital filters (344 and 346) and provided to a wideband phase detector such as a CORDIC wideband detector 348. Further, the format block builds a Synchronous Serial Interface (SSI) frame 352. For example, an SSI frame may be 48 bits that may include 16 bits of data from the I channel, 16 bits of data from the Q channel, 8 bits of power or AGC configuration information, and another 8 bits of miscellaneous control information.

The CORDIC wideband phase detector 348 provides a processor 356 with a carrier indication signal 354. As described above, the carrier indication signal may be in the form of phase information extracted from the wideband composite information signals, or it may be in the form of a function of extracted phase information, such as frequency information. The information contained in the signal is indicative of the carrier frequency of the larger magnitude information signal. The processor 356 may provide a channel select signal 360 to an automatic gain control (AGC) state machine 362 based on the average and variance of the output signal 354 of the CORDIC wideband detector output. In addition, the AGC state machine 360 receives an energy detect signal 358 from the analog-to-digital converter 342 which is based on the total power of the information signals further discussed when describing the AGC state machine in FIG. 4. The energy detect signal may take the form of a receive signal strength indicator signal, or RSSI. Further, the state machine 362 provides control signals (368 and 366) to each of the attenuators (308 and 316) coupled to the channel tuners or other appropriate signal processing elements associated with the information signals. Based on the average and variance of the carrier strength information signal 354 and the energy detect signal 358, the processor can determine whether one information signal (from either channel 1 and channel 2) has a magnitude substantially larger than the other information signal. For example, if the magnitude of the information signal corresponding to channel 1 is substantially larger than the magnitude of the information signal corresponding to channel 2, the processor 356 may provide a channel select signal to the state machine 362 such that the state machine provides a control signal 368 to the attenuator 308 coupled to the channel 1 tuner. Thus, the attenuator 308 attenuates the information signal of channel 1 so that it may not negatively impact the information signal of channel 2. The AGC circuit may also control an aggregate continuous AGC signal 364 to control the overall amplification by the LNA to ensure the IF signal from combiner 318 is of appropriate magnitude. In other embodiments, the AGC state machine may provide a control signal (368 and 366) to a selected attenuator (308 and 316) to increase an attenuation level at a predetermined rate. Further, the selected attenuator and rate of change may be determined based on the carrier indication signal.

Figure 4:
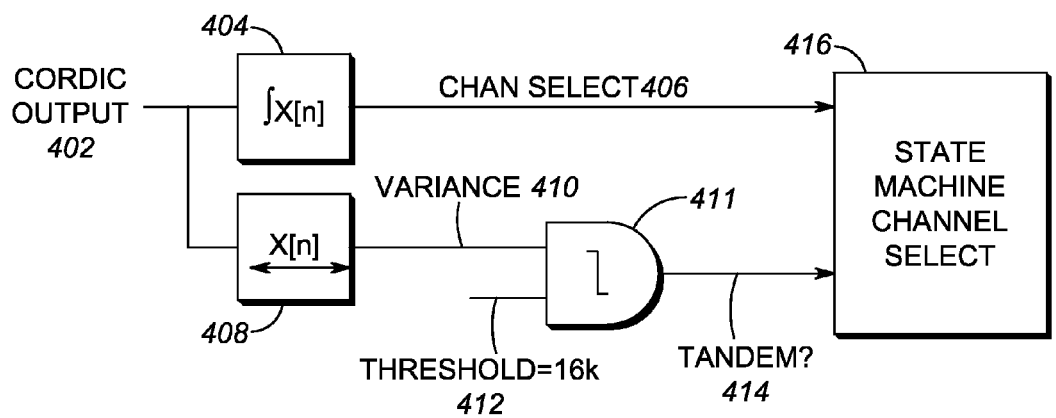
FIG. 4 is an example system for attenuating one or more information signals to improve signal quality in a receiver using the variance output of a wideband phase detector and a state machine.

FIG. 4 is an example system 400 for attenuating one or more information signals to improve signal quality in a receiver using the variance output of the wideband detector and a state machine. In particular, the example system 400 may be a processor or attenuation controller coupled to a state machine. Such system 400 may include an averaging function 404 that receives a carrier indication signal 402 from a CORDIC detector and generates a channel select signal 406, which is the average of the carrier indication signal 402. Thus, signal 406 indicates which information signal is dominant in accordance with the FM capture characteristics of the wideband detector. Further, the carrier indication signal 402 may be received by a variance function 408. The variance function 408 may provide a variance signal 410 of the carrier indication signal 402. Such a variance signal 410 may be determined to be above a threshold (using an AND gate or other threshold device 411) and such a determination, corresponding to output 414 of threshold device 411, is provided to the state machine channel select 416. If a secondary signal, which in this embodiment is the variance 410 of the carrier indication signal 402, is below a certain threshold, then the output 414 indicates that the carriers are not substantially similar, and are thus not in tandem, and the state machine 416 determines that the magnitude of the other information signal is substantially below the other information signal. The state machine responsively generates control signals to attenuate the information signal associated with the channel select signal 406. On the other hand, if the variance 410 is above the threshold, then the state machine channel select 416 may determine that no adjustment to the attenuators is necessary, or, alternatively, that both signals should be attenuated.

The following table shows an example function of the processor or attenuation controller shown in FIG. 4, where "Channel Selected" column shows whether the average of the carrier indication signal corresponds with the predetermined carrier frequency of information signal 1 (i.e., Channel #1) or information signal 2 (i.e., Channel #2), the "Variance" column indicates the measured variance of the carrier information signal, and the "Attenuation Channel Decision" indicates the output of the state machine that controls the addition of attenuation to Channel 1, Channel 2, both, or neither.

TABLE 1

State Machine Logic

| Channel selected | Variance | Attenuation Channel Decision |
|---|---|---|
| RSSI < −80 dBm | N/A | None |
| Chan#1 | <16k | Chan#1 |
| Chan#2 | <16k | Chan#2 |
| Chan#1 or Chan#2 | >=16k | Both |

That is, if the total receiver power (e.g., RSSI—power of the information signals of Channel 1 and Channel 2) is below a certain threshold (e.g., −80 dBm) then neither signal from channel 1 or channel 2 needs to be attenuated. For the next three rows of Table 1, the RSSI is greater than the threshold, such as −80 dBm. Further, if channel 1 is indicated as being dominant (according to the average value of the carrier indication signal), and the variance is less than 16,000 (which, in one embodiment, is based on a given analog to digital converter resolution, and other engineering design choices) in value then the information signal corresponding to channel 1 is attenuated. Similarly, if channel 2 is dominant and the variance is less than 16,000 in value, then the information signal corresponding to channel 2 is attenuated. Alternatively, if the total receiver power is above a certain threshold and the variance is greater than 16,000, then both the information signals are attenuated. In various embodiments, attenuators 308 and 316 may add the attenuation, or a gain control circuit within LNA 320 in response to the continuous AGC signal 364, or both.

Figure 5:
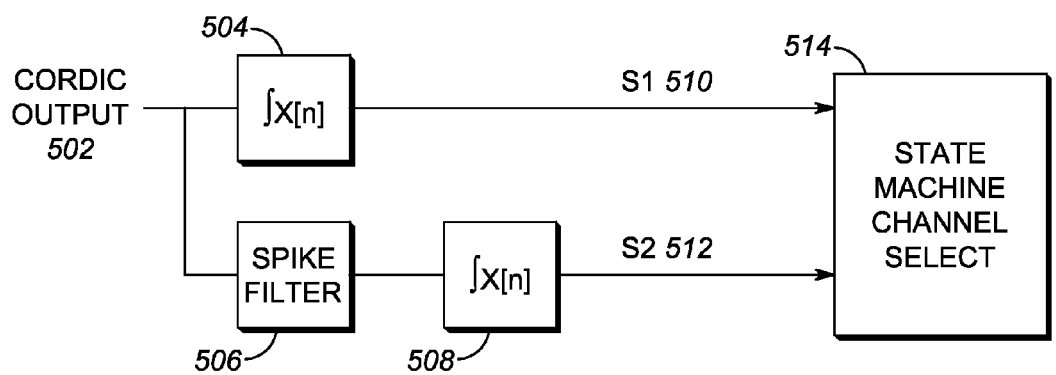
FIG. 5 is an example system for attenuating one or more information signals to improve signal quality in a receiver using a phase spike filter and a state machine.

FIG. 5 is an example system 500 for attenuating one or more information signals to improve signal quality in a receiver using a phase spike filter 506 and a state machine. In particular, the example system 500 may be a processor or attenuation controller coupled to a state machine. Such system 500 may include an averaging function 504 that receives a demodulated output signal 502 from a wideband phase detector such as a CORDIC wideband phase detector. Further, the carrier indication signal 502 is received by a phase spike filter 506, the output of which is provided to an averaging function 508. When the information signals are of substantially similar magnitude, the CORDIC output contains a high number of phase spikes. In addition, the averaging function 508 provides an output signal (S2) 512 to a state machine channel select 514. Another input to the state machine channel select 514 is a channel select signal (S1) 510 which is output by averaging function 504 and is the average of the carrier indication signal 502. A spike in phase detected in the carrier indication signal 502 may determine that a magnitude of one of the information signals is substantially larger than or substantially similar to the magnitude of the other information signal.

Details of a spike in phase may determine whether information signals are substantially similar in magnitude or not can be shown as follows. When the ratio of the two signal power levels approach unity, the demodulator output will tend to converge to the average of the two demodulated signals.

However, due to the phase wrapping, the demodulated signal will have spurious peaks thereby biasing the average value. A simple feed-forward spike removal filter may be used to remove the spurious peaks that will produce the expected theoretical result. Spike removal is a nonlinear filtering operation and conventional methods adopt the popular median filtering approach to remove spikes that can be considered as outlier samples. However, median filtering is computationally intensive and can result in signal distortion if the window length is not chosen correctly. In one embodiment, the spike filter algorithm performs linear, but non-causal filtering to remove the spikes using both previous and future samples.

If S1 is approximately equal to S2 within a threshold, then the signal 510 (the signal strength indication signal average) alone determines which channel to attenuate based on the DC estimate S1 (or S2). However, if S1 does not equal S2 within a threshold, then the two information signals contained within the intermediate frequency signal are substantially equal in magnitude and both information signals can be treated equally—in some embodiments, they may both be attenuated to prevent overdriving the analog to digital converter, and in other embodiments, they may both be unattenuated because the signals may be strong and the Signal-to-Noise (SNR) is high enough to allow distortionless data signal recovery.

Figure 6:
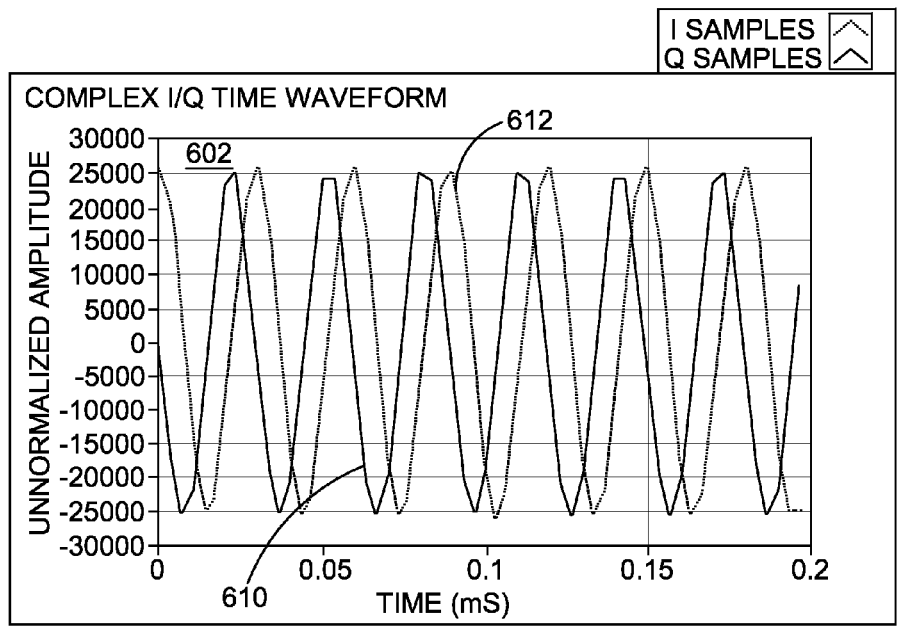
FIG. 6 is an example of one information signal at a first predetermined carrier frequency.
Figure 6:
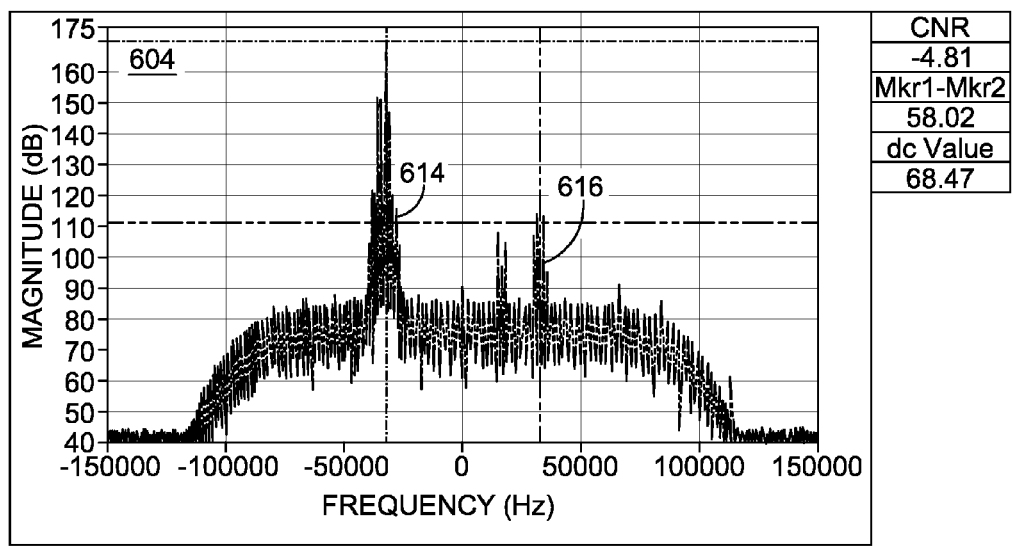
Figure 7:
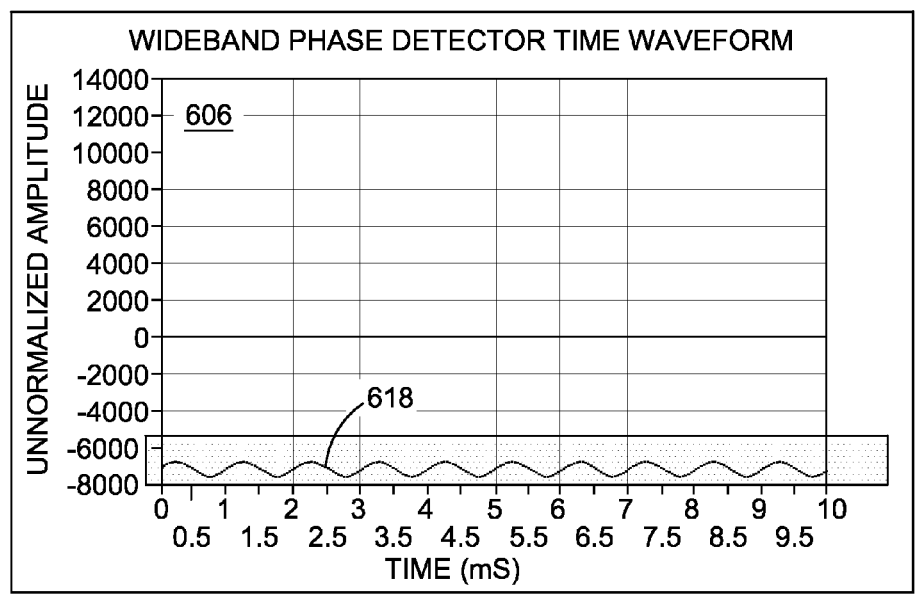
FIG. 7 are example graphs of the carrier indication signal output of a wideband phase detector.
Figure 7:
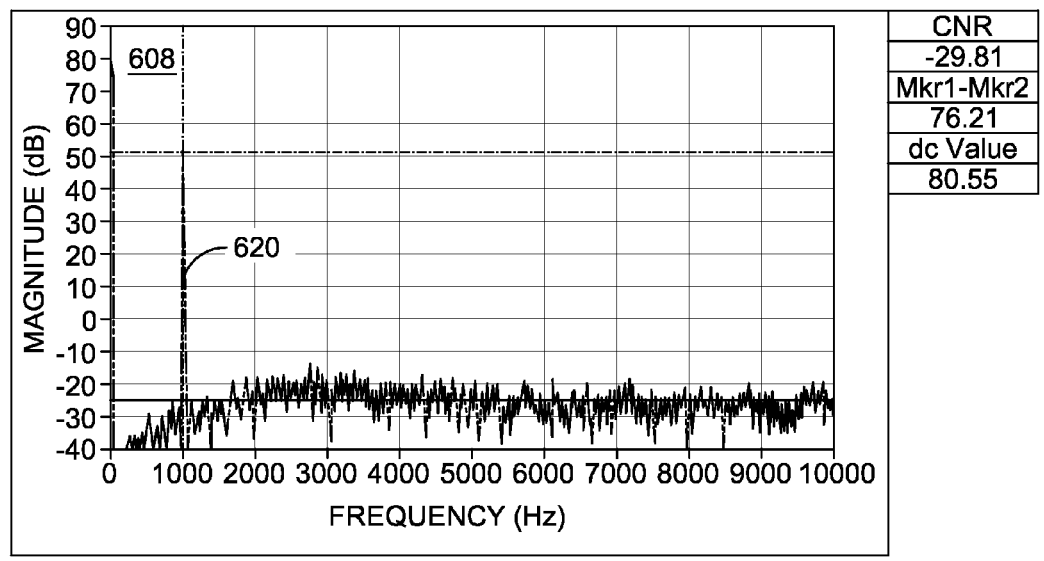

Referring to FIG. 6, chart 602 includes a single information signal broken down into and I channel 610 and a Q channel 612 as shown in FIG. 3. Further, chart 604 shows the single information signal that has been placed at respective predetermined carrier frequency of −32.5 kHz by selective tuning and down-conversion processes. There is a reflection signal 616 of the information signal 614. Further, chart 606 of FIG. 7 shows the carrier indication signal provided by the wideband phase detector associated with this single information signal. Note that the DC value or average lies within a window centered around −7000, which is the value associated with the information signal at the first predetermined carrier frequency. The oscillations seen on signal 618 are a result of the data signal carried by the information signal being detected by the wideband phase detector. If there was no modulation (which in this example is merely a 1 kHz tone), i.e., if the receiver signal was only a carrier wave (silent carrier), then the wideband phase detector output signal would only have a DC output. Similarly, with reference to FIG. 7, chart 608 shows signal 620, which is the power spectral density (PSD) of the carrier indication signal. It shows a peak at 0 Hz, or DC, corresponding to the carrier, and another peak at 1 kHz corresponding to the 1 kHz signal modulated onto the carrier.

Figure 8:
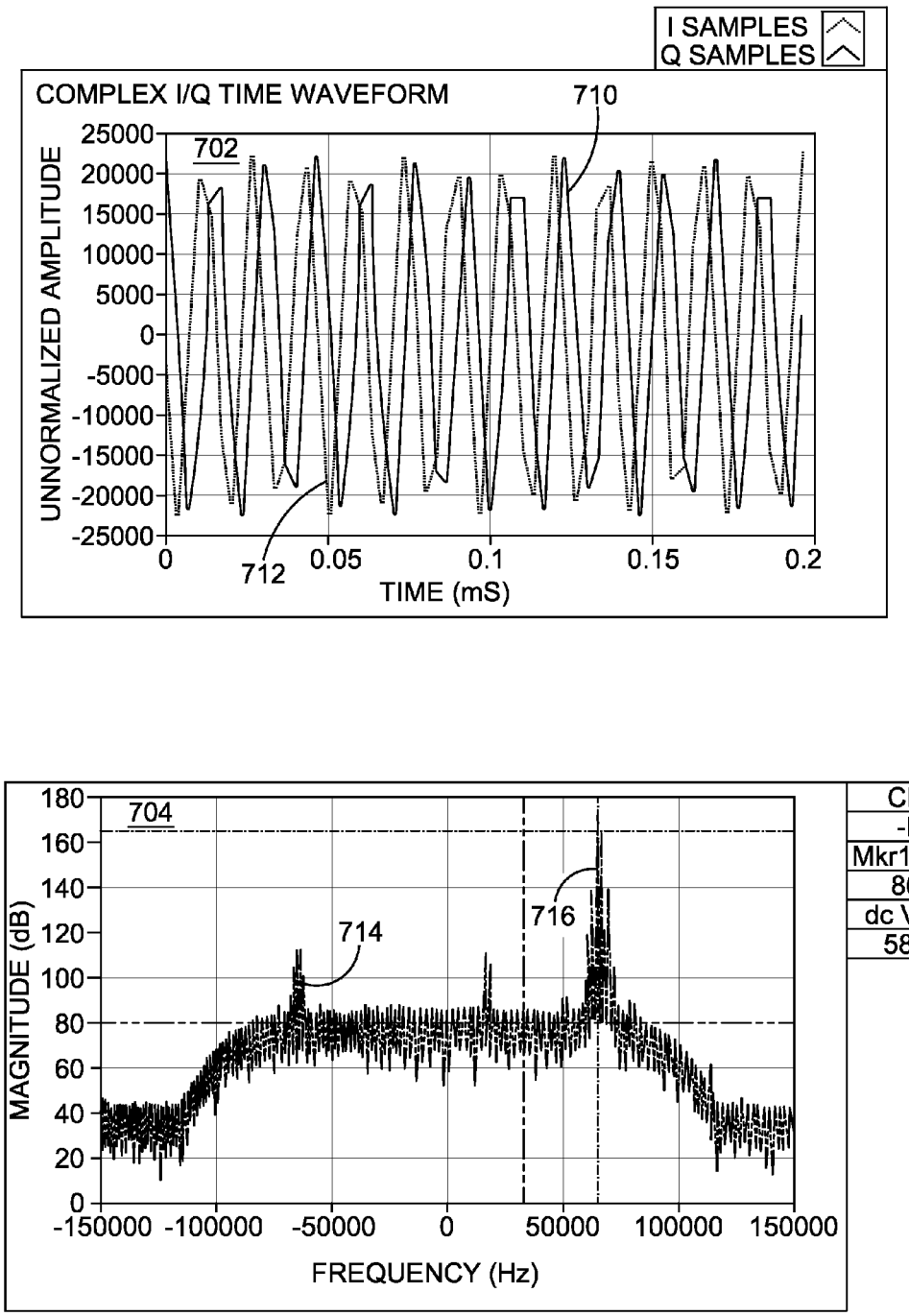
FIG. 8 is an example of an information signal at a second predetermined carrier frequency.
Figure 9:
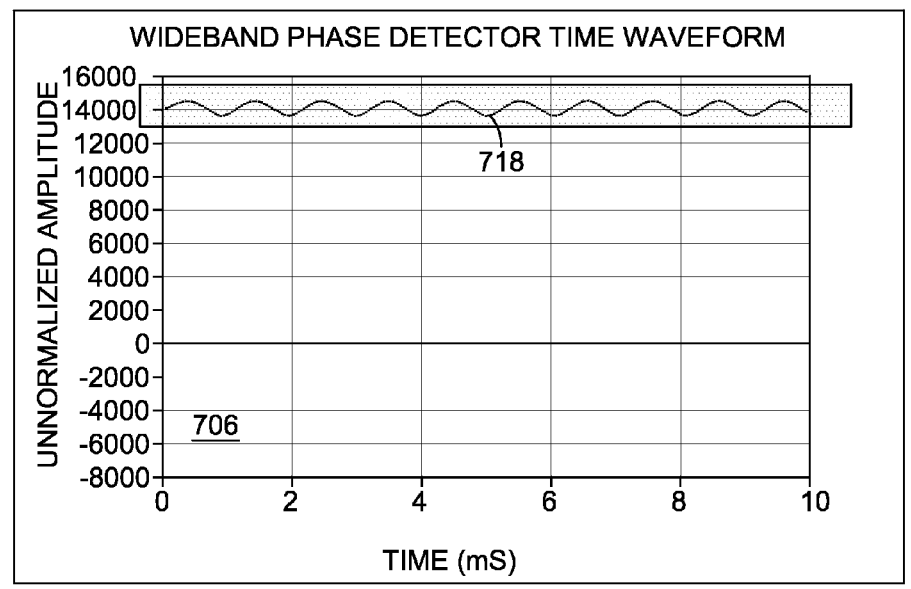
FIG. 9 are example graphs of the carrier indication signal output of a wideband phase detector.
Figure 9:
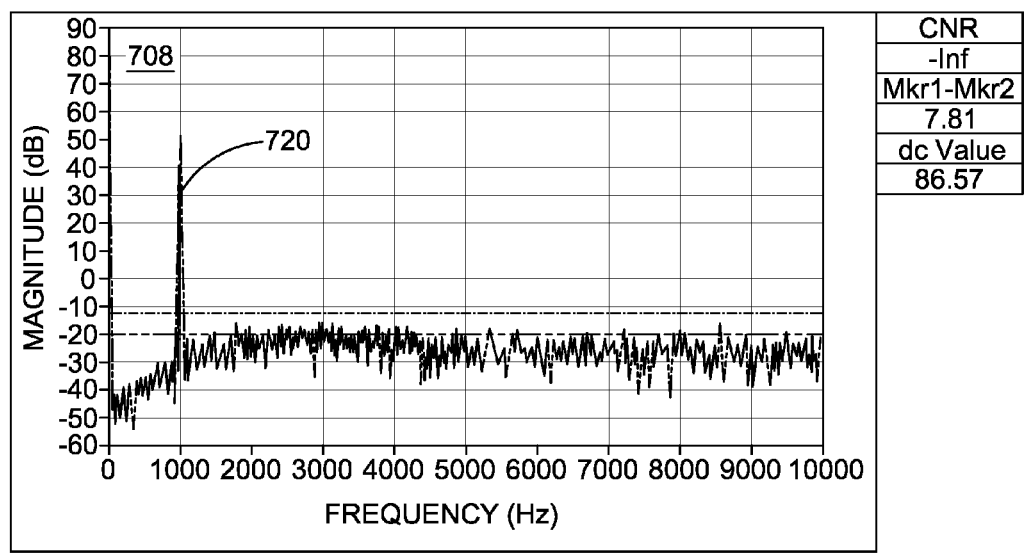

With respect to FIG. 8, a second information signal is shown chart 702 in I-Q format (waveforms 710, 712). This is depicted as information signal 716 in chart 704 in the frequency domain with predetermined carrier frequency of 62.5 kHz. Similarly, signal 714 is an image of the information signal 716. Chart 706 of FIG. 9 shows the carrier indication signal 718 associated with the second information signal 716. Note the DC value is centered around 14,000, which is the average value of the offset (according to engineering design choices) associated with the predetermined carrier frequency of 62.5 kHz. Referring to FIG. 9, chart 708 shows signal 720, which is the Power Spectral Density (PSD) of signal 718. The peak at DC is due to the carrier, and the data signal modeled as a simple 1 kHz oscillation that is modulated onto the carrier provides the peak at 1 KHz.

Figure 10:
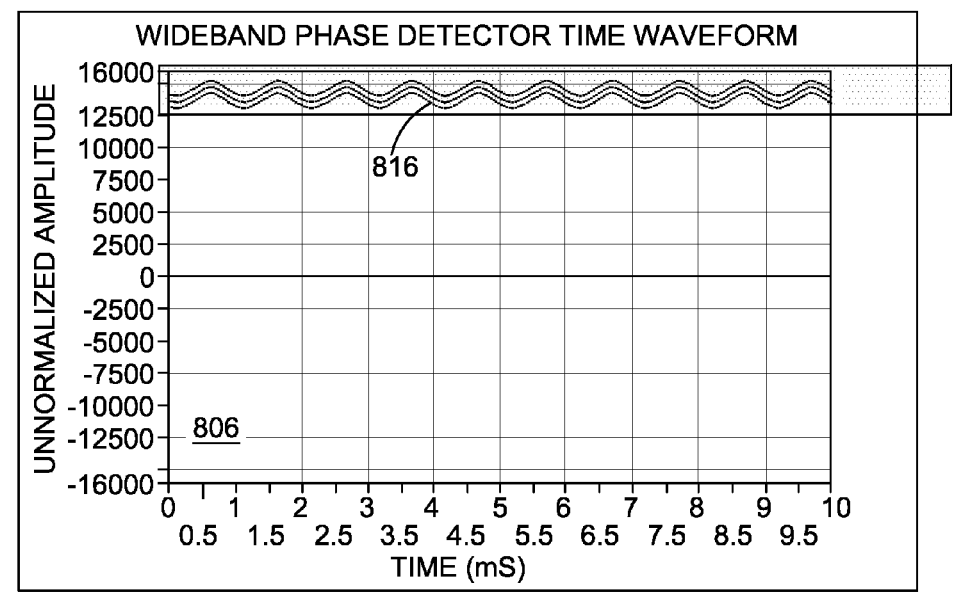
FIG. 10 is example of two information signals of dissimilar magnitudes and respective output graphs of a wideband phase detector.
Figure 10:
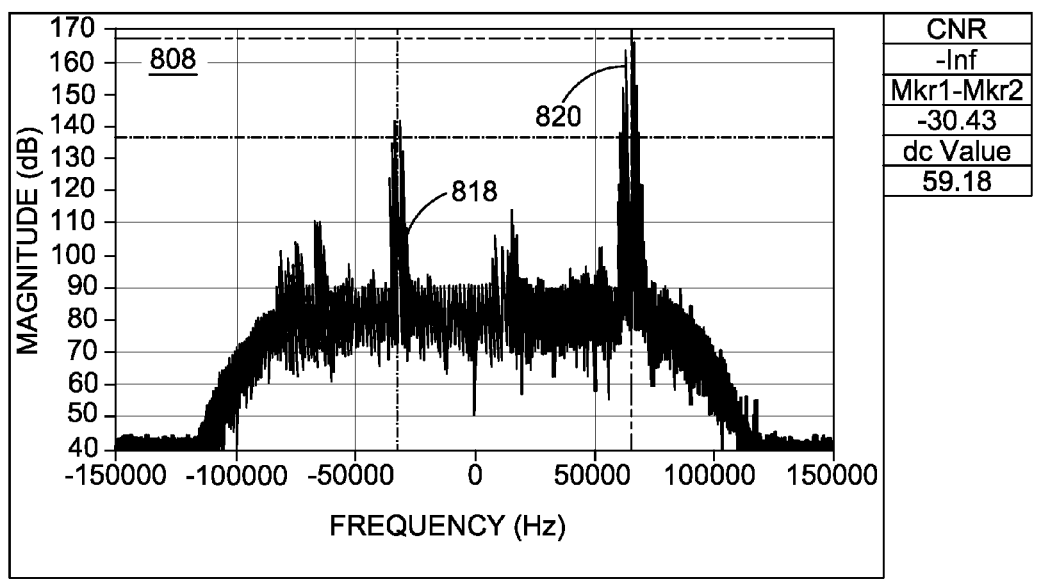

Referring to FIG. 10, chart 808 shows an intermediate frequency signal with two information signals, the first information signal 818 (at predetermined carrier frequency −32.5 kHz) and the second information signal 820 (at predetermined carrier frequency 62.5 kHz). In the example of FIG. 10, the first information signal 818 is 30 dB less than the second information signal 820. Chart 806 depicts the carrier indication signal 816 that is characterized by an average value of approximately 14,000, and a variance that is relatively small and significantly below the threshold of 16,000. Thus, in this example, the first and second information signals are not of substantially similar magnitudes because the average of the carrier strength signal is at a value associated with one of the predetermined carrier frequencies. In one embodiment, the attenuator associated with the second information signal may be increased until the average of signal 816 changes (i.e., it changes to a value associated with another predetermined carrier frequency, or it converges to some intermediate value) indicating that the information signals are of substantially similar values. In an alternative embodiment, a second signal may be analyzed, such as the variance of the carrier indication signal 816. In this case, the variance would indicate that the magnitude of the first information signal is significantly less than the second information signal, and again, the attenuation of the second information signal may be increased to compensate. In a further embodiment, the second signal may be a spike-filtered version of the carrier indication signal 816. In this embodiment, spike filtering would not significantly alter the characteristics of signal 816, indicating that the second information signal has significantly greater magnitude than the first information signal 820.

Figure 11:
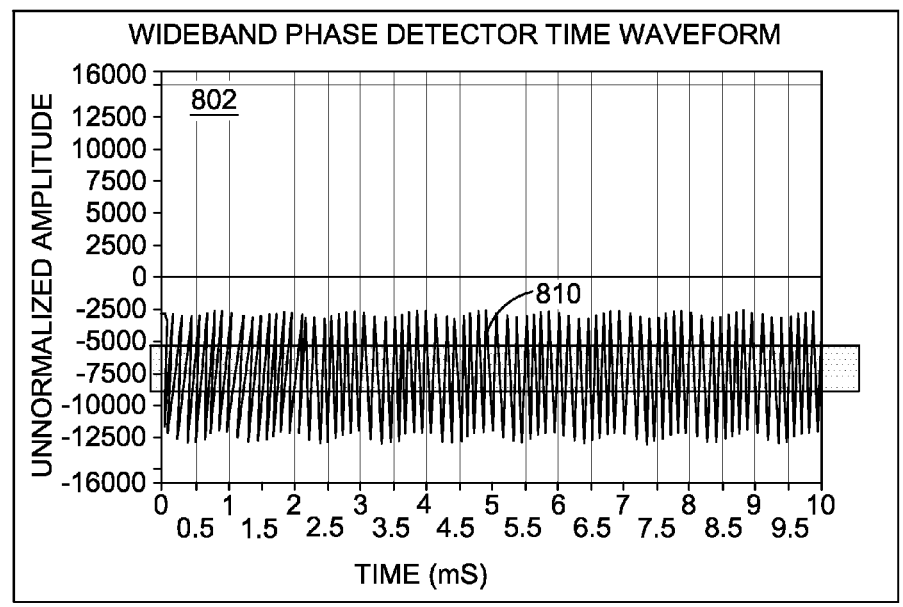
FIG. 11 is example of two information signals of similar magnitudes and respective output graphs of a wideband phase detector.
Figure 11:
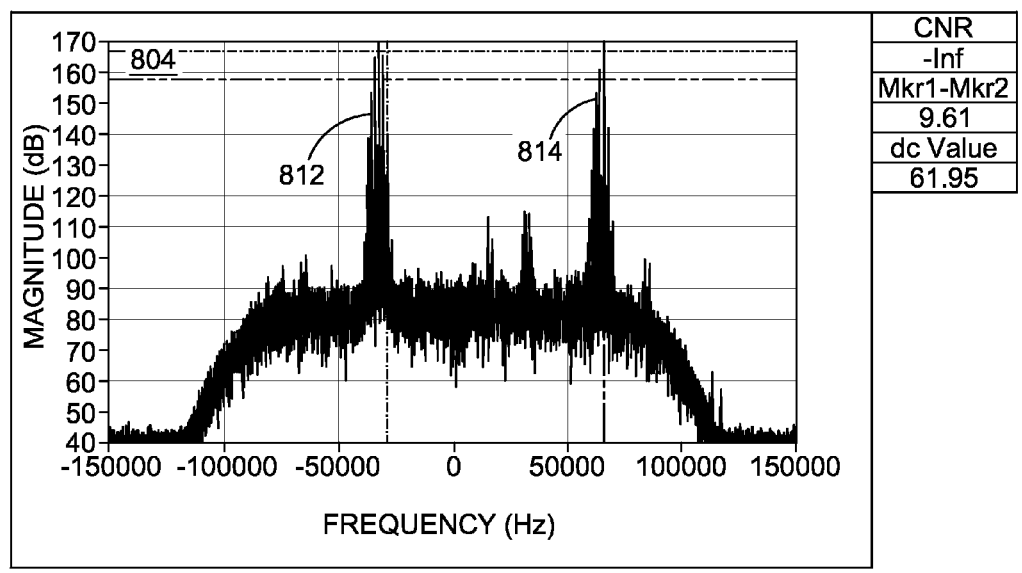

Further, with respect to FIG. 11, chart 804 shows an intermediate frequency signal with two information signals, the first information signal 812 (at predetermined carrier frequency −32.5 kHz) and the second information signal 814 (at predetermined carrier frequency 62.5 kHz). In the example of FIG. 11, the first information signal 812 is 10 dB greater than the second information signal 820.

A processor or attenuation controller may process the signals shown in chart 802 and based on the characteristics of the carrier indication signal 810 would determine that the information signals are substantially similar in magnitude. In particular, the signal 810 shows an average value (or DC offset) of about −7,000. In one embodiment, the attenuator associated with information signal 1 may be increased until the average of the carrier indication signal changes. In alternative embodiments, the carrier indication signal may be processed to determine that the magnitude of the information signal corresponding to channel 1 to be relatively larger than the magnitude of the information signal corresponding to channel 2 (based on the average), but that the relatively high variance (e.g., above a given threshold) indicates the second information signal has a similar magnitude.

Figure 12:
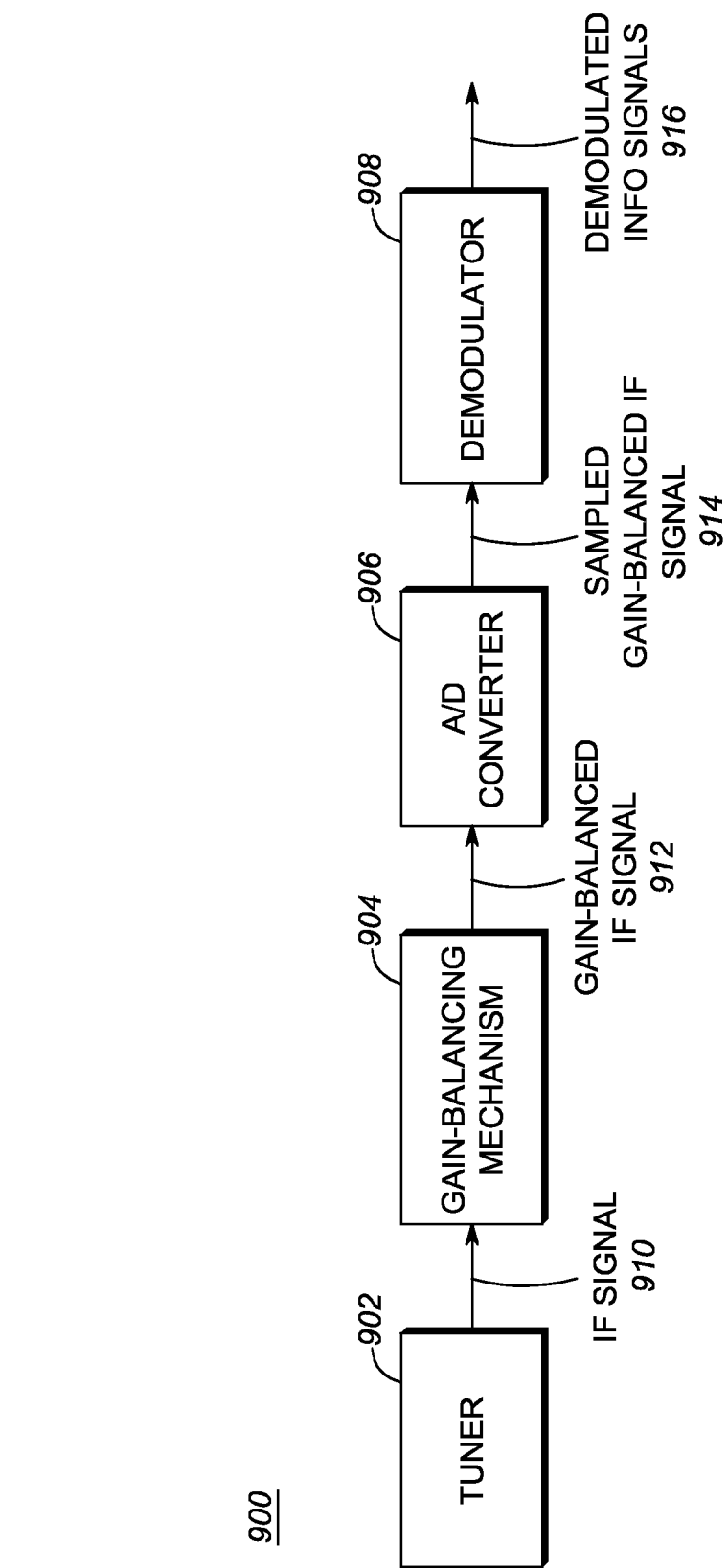
FIG. 12 is a functional block diagram of an example multi-channel receiver.

FIG. 12 is a functional block diagram of an example receiver 900 that includes a multi-channel tuner 902, a gain-balancing mechanism 904, an analog-to-digital converter (A/D) 906, and a demodulator 908. The tuner 902 provides an analog intermediate frequency (IF) signal 910 to the gain-balancing mechanism 904. The analog IF signal may include two or more information signals at predetermined carrier frequencies. Examples of the gain-balancing mechanism 904 may include the system shown in FIG. 1 and FIG. 3 that include a wideband phase detector as well as a processor, attenuation controller, or state machine and two or more attenuators to attenuate the one of the information signals to provide an analog gain-balanced IF signal 912 to the A/D converter 906 to be sampled. The A/D converter produces a sampled gain-balanced IF signal 914 that is provided to a demodulator 908. Note that the demodulator 908 is different than the wideband phase detector. In particular, the wideband phase detector and its carrier indication signal are not used to recover the modulated information of either the first or the second information signals. Rather, it is used to process the composite wideband signal and to use the FM capture effect to identify which of the information signals has the greater magnitude. The demodulator 908, on the other hand, may include a plurality of individual demodulation circuits, each one appropriately configured to demodulate the given information signal, and produces demodulated information signals 916 as an output of the multi-channel receiver.

Figure 13:
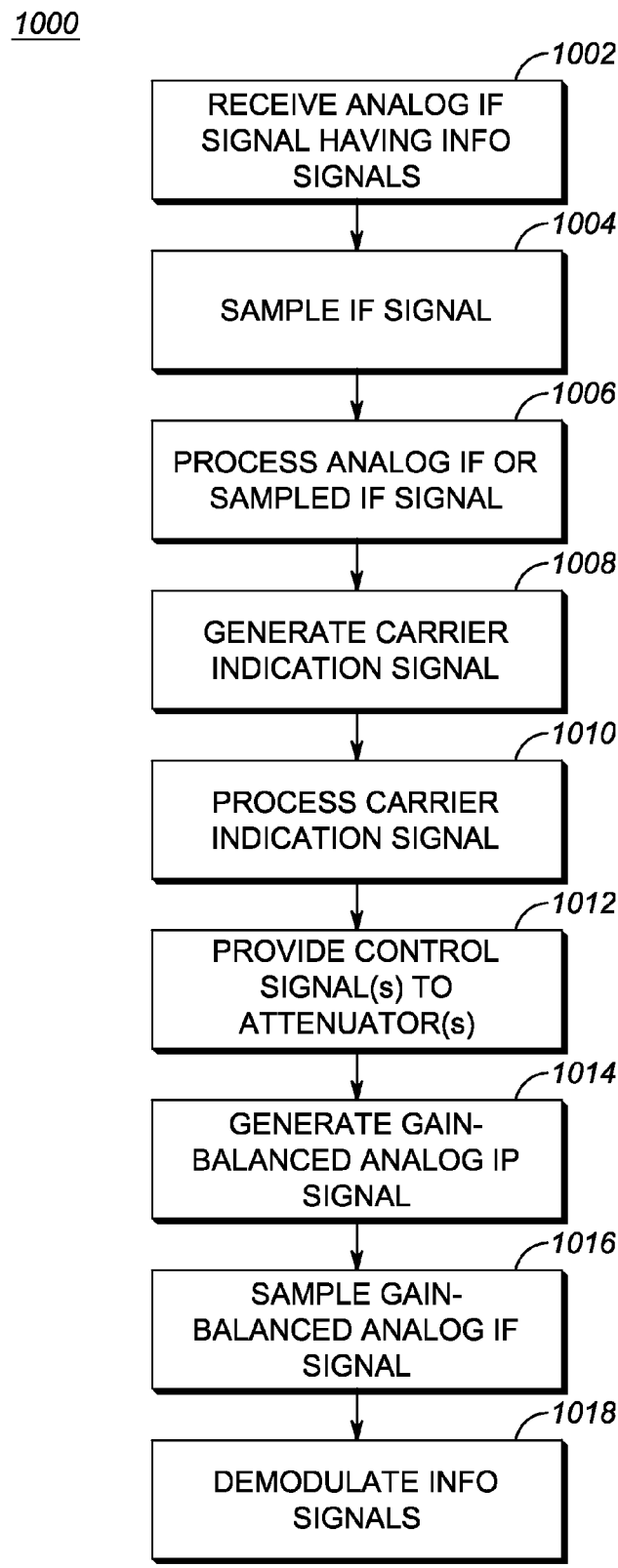
FIG. 13 is an example flowchart for an example method attenuating one or more information signals to improve signal quality in a receiver using a wideband phase detector.

FIG. 13 is an example flowchart for an example method 1000 attenuating one or more information signals to improve signal quality in a receiver using a wideband phase detector. The example method 1000 includes receiving an analog intermediate frequency (IF) signal having a two or more information signals at predetermined carrier frequencies, as shown in block 1002. The analog IF signal may be generated by combining two or more information signals through a separate downconversion processes such that controlling the power (or magnitude) of at least one of the information signals is performed prior to combining the information signals. In an alternative embodiment, a pass-band filter may be configured to operate on the combined composite signal to attenuate the desired information signal.

The example method 1000 further includes sampling the analog IF signal by an A/D converter, as shown in block 1004. In addition, a wideband phase detector (e.g. a CORDIC demodulator) may process either the multi-channel analog IF signal or a sampled IF signal, as shown in block 1006. Also, the example method 1000 includes the wideband phase detector generating a carrier indication signal, as shown in block 1008. A processor or attenuation controller may process the carrier indication signal to determine whether one of the information signals have a substantially larger magnitude than the other, as shown in block 1010. Such a determination may be based on the average of the carrier indication signal and the variance of the carrier indication signal, or by the average value of the carrier indication signal, or simply by detecting a change in the average value. The average of the carrier indication signal is indicative of a magnitude of one of the information signals and the variance of the carrier indication signal is indicative of the relative magnitude of one of the information signals with respect to the other(s). Further, the example method includes providing one or more control signals to corresponding attenuator(s) to attenuate the substantially larger magnitude information signal, as shown in block 1012. In other embodiments, the processor or attenuation controller may provide a control signal to a selected attenuator to increase an attenuation level at a predetermined rate. Further, the selected attenuator and rate of change may be determined based on the carrier indication signal. The attenuation of the information signal generates a gain-balanced analog IF signal, as shown in block 1014. An A/D converter samples the gain-balanced analog IF signal, as shown in block 1016. Further, the sampled gain-balanced analog IF signal is provided to a demodulator to demodulate the information signals, as shown in block 1018.

Figure 14:
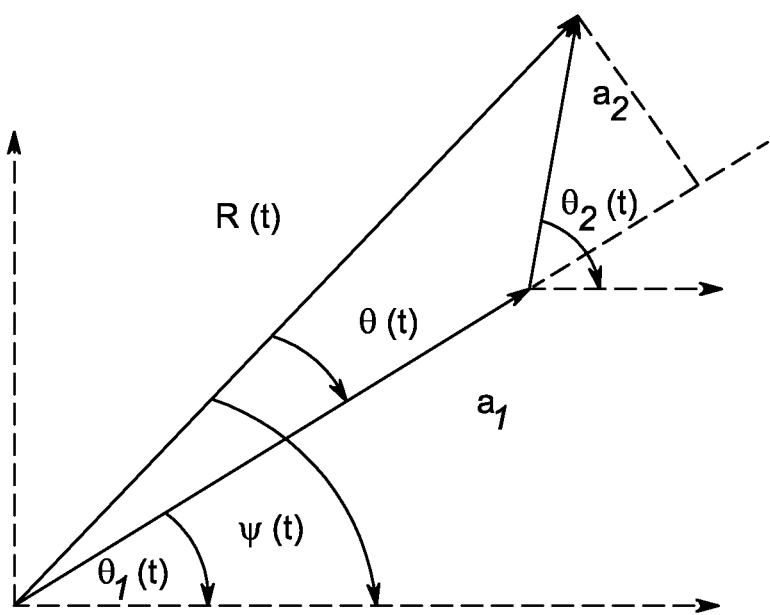
FIG. 14 is a phase diagram used to show aspects of a wideband phase detector.

Referring now to FIG. 14, a mathematical basis for determining whether a magnitude of one information signal is substantially larger than another may be described as follows. Let $s_1(t)$ and $s_2(t)$ represent the down-mixed baseband signals at intermediate frequencies $\omega_1$ and $\omega_2$ respectively. The information signals are embedded in the phases $\phi_1(t)$ and $\phi_2(t)$ respectively such that $$s_1(t)=a_1 \cos(\omega_1 t+\phi_1(t))$$

$$s_2(t)=a_2 \cos(\omega_2 t+\phi_2(t))$$

Let the instantaneous phase of the individual signals be represented by $\theta_1(t)$ and $\theta_2(t)$ respectively, viz., $\theta_1(t)=\omega_1 t+\phi_1(t)$ and $\theta_2(t)=\omega_2 t+\phi_2(t)$. In the phasor representation, the resultant baseband signal can be represented as $$\hat{s}(t)=\text{Real}\{R(t)e^{j\psi(t)}\}$$

where, R(t) is the envelope of the resultant baseband signal and $\psi(t)$ represents the instantaneous phase of the resultant baseband signal.

$$R^2(t)=(a_2 \cos(\theta_2(t))+a_1 \cos(\theta_1(t)))^2+(a_2 \sin(\theta_2(t))+a_1 \sin(\theta_1(t)))^2$$

$$R^2(t)=a_1^2+a_2^2+a_1 a_2 \cos(\theta_2(t)-\theta_1(t))$$

The resultant instantaneous phase is given by, $$\psi(t)=\theta_1(t)+\theta(t)$$

From the phasor diagram shown in FIG. 14, $$\tan(\theta(t)) = \frac{a_2 \sin(\theta_2(t) - \theta_1(t))}{a_1 + a_2 \cos(\theta_2(t) - \theta_1(t))}$$

$$\psi(t) = \theta_1(t) + \tan^{-1}\frac{a_2 \sin(\theta_2(t) - \theta_1(t))}{a_1 + a_2 \cos(\theta_2(t) - \theta_1(t))}$$

Let $\epsilon(t)=\theta_2(t)-\theta_1(t)$ and $$\alpha = \frac{a_2}{a_1},$$

we get, $$\psi(t) = \theta_1(t) + \tan^{-1}\frac{\alpha \sin(\varepsilon(t))}{1 + \alpha \cos(\varepsilon(t))}$$

The demodulated CORDIC output will be, $$\frac{\partial \psi(t)}{\partial t} = \frac{\partial \theta_1(t)}{\partial t} + \frac{\alpha(\alpha + \cos(\varepsilon(t)))}{1 + \alpha^2 + 2\alpha \cos(\varepsilon(t))} \frac{\partial \varepsilon(t)}{\partial t}$$

The first term may include the DC term corresponding to the offset frequency $\omega_1$ and the information signal $m_1(t)$ respectively. The second derivative in the above equation is given by, $$\frac{\partial \varepsilon(t)}{\partial t} = \omega_2 - \omega_1 + m_2(t) - m_1(t)$$

$$\frac{\partial \psi(t)}{\partial t} = \omega_1 + m_1(t) + \left(\frac{\alpha(\alpha + \cos(\varepsilon(t)))}{1 + \alpha^2 + 2\alpha \cos(\varepsilon(t))}\right)(\omega_2 - \omega_1 + m_2(t) - m_1(t))$$

For convenience, assuming $\omega_1=0$ and $\omega_2-\omega_1=\omega_\Delta$, the above equation can be rewritten as, $$\frac{\partial \psi(t)}{\partial t} = m_1(t) + \left(\frac{\alpha(\alpha + \cos(\varepsilon(t)))}{1 + \alpha^2 + 2\alpha \cos(\varepsilon(t))}\right)(\omega_\Delta + m_2(t) - m_1(t))$$

$$= m_1(t) + \left(\frac{\alpha(\alpha + \cos(\varepsilon(t)))}{1 + \alpha^2 + 2\alpha \cos(\varepsilon(t))}\right)(\omega_\Delta + m_2(t) - m_1(t))$$

$$= \left(\frac{(1 + \alpha \cos(\varepsilon(t)))}{1 + \alpha^2 + 2\alpha \cos(\varepsilon(t))}\right) m_1(t) + \left(\frac{\alpha(\alpha + \cos(\varepsilon(t)))}{1 + \alpha^2 + 2\alpha \cos(\varepsilon(t))}\right)(\omega_\Delta + m_2(t))$$

Observe that if $\alpha \gg 1$, i.e., second signal is substantially stronger than the first one, the demodulated output approaches $$\frac{\partial \psi(t)}{\partial t} = \omega_\Delta + m_2(t)$$

If $\alpha \ll 1$, then the demodulated signal approaches, $$\frac{\partial \psi(t)}{\partial t} = m_1(t)$$

The above two equations illustrate the limiting cases of FM capture where the dominant signal in one of the two channels will be the resultant demodulated CORDIC output.

For the special case of $\alpha=1$, the demodulated signal takes the form, $$\frac{\partial \psi(t)}{\partial t} = \frac{1}{2}(m_1(t) + m_2(t) + \omega_\Delta)$$

In this case, the DC in the demodulated signal is half of the frequency separation.

The foregoing is illustrative only and is not intended to be in any way limiting. Reference is made to the accompanying drawings, which form a part hereof. In the drawings, similar symbols typically identify similar components, unless context dictates otherwise.

Note that the functional blocks, methods, devices and systems described in the present disclosure may be integrated or divided into different combination of systems, devices, and functional blocks as would be known to those skilled in the art.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or, "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed:

1. A method comprising:
receiving an intermediate frequency (IF) signal having a plurality of information signals at predetermined carrier frequencies;
generating a carrier indication signal by processing the IF signal with a wideband phase detector;
attenuating at least one of the information signals based on an average of the carrier indication signal; and
iteratively determining the average of the carrier indication signal and attenuating the at least one of the information signals until the magnitudes of the plurality of information signals are substantially similar.

2. The method of claim 1, wherein attenuating at least one of the information signals comprises providing an attenuation control signal to one of a plurality of attenuators.

3. A method comprising:
receiving an intermediate frequency (IF) signal having a plurality of information signals at predetermined carrier frequencies;
generating a carrier indication signal by processing the IF signal with a wideband phase detector;
attenuating at least one of the information signals based on an average of the carrier indication signal; and
wherein attenuating at least one of the information signals is also based on a second signal selected from the group consisting of a variance of the carrier indication signal and a phase-spike filter output, and wherein a state machine processes the average of the carrier indication signal and the second signal.

4. A method comprising:
receiving an intermediate frequency (IF) signal having a plurality of information signals at predetermined carrier frequencies;
generating a carrier indication signal by processing the IF signal with a wideband phase detector;
attenuating at least one of the information signals based on an average of the carrier indication signal; and
wherein attenuating at least one of the information signals is also based on a second signal selected from the group consisting of a variance of the carrier indication signal and a phase-spike filter output, and
wherein the average of the carrier indication signal is indicative of a magnitude of one of the plurality of information signals and the variance of the carrier indication signal is indicative of the relative magnitude of another of the plurality of information signals.

5. A method comprising:
receiving an intermediate frequency (IF) signal having a plurality of information signals at predetermined carrier frequencies;
generating a carrier indication signal by processing the IF signal with a wideband phase detector;
attenuating at least one of the information signals based on an average of the carrier indication signal; and
wherein the carrier indication signal is generated by the wideband phase detector operating on a sampled version of the IF signal, and wherein the wideband phase detector is a coordinate rotation digital computer.

6. An apparatus, comprising:
a wideband phase detector configured to receive an intermediate frequency (IF) signal having a plurality of information signals at predetermined carrier frequencies and to generate a carrier indication signal, wherein the wideband phase detector is a CORDIC demodulator;
one or more attenuators, each attenuator corresponding to one of the plurality of information signals, and configured to attenuate its respective information signal; and
an attenuation controller configured to provide control signals to the one or more attenuators to attenuate one or more corresponding information signals based on an average of the carrier indication signal.

7. An apparatus, comprising:
a wideband phase detector configured to receive an intermediate frequency (IF) signal having a plurality of information signals at predetermined carrier frequencies and to generate a carrier indication signal;
one or more attenuators, each attenuator corresponding to one of the plurality of information signals, and configured to attenuate its respective information signal;
an attenuation controller configured to provide control signals to the one or more attenuators to attenuate one or more corresponding information signals based on an average of the carrier indication signal; and
wherein the attenuation controller is configured to:
determine an average of the carrier indication signal and a variance of the carrier indication signal;
determine if the variance is below a threshold and responsively provide a control signal to increase attenuation of a first attenuator if the average is substantially near a first value or provide a control signal to increase attenuation of a second attenuator if the average is substantially near a second value.

8. An apparatus, comprising:
a wideband phase detector configured to receive an intermediate frequency (IF) signal having a plurality of information signals at predetermined carrier frequencies and to generate a carrier indication signal;
one or more attenuators, each attenuator corresponding to one of the plurality of information signals, and configured to attenuate its respective information signal;

an attenuation controller configured to provide control signals to the one or more attenuators to attenuate one or more corresponding information signals based on an average of the carrier indication signal; and wherein the attenuation controller is configured to:

determine an average of the carrier indication signal;

provide a control signal to a selected attenuator to increase an attenuation level at a predetermined rate, the selected attenuator determined based on the average of the carrier indication signal;

detect a change in the average of the carrier indication signal and responsively set the attenuation level.

9. An apparatus, comprising:

a wideband phase detector configured to receive an intermediate frequency (IF) signal having a plurality of information signals at predetermined carrier frequencies and to generate a carrier indication signal;

one or more attenuators, each attenuator corresponding to one of the plurality of information signals, and configured to attenuate its respective information signal; and an attenuation controller configured to provide control signals to the one or more attenuators to attenuate one or more corresponding information signals based on an average of the carrier indication signal;

one or more mixers each configured to generate downconverted information signals;

a signal combiner configured to generate the IF signal from the downconverted information signals; and wherein the one or more attenuators operate on individual downconverted information signals prior to being combined by the signal combiner.

10. A method comprising:

receiving an analog intermediate frequency (IF) signal having a plurality of information signals at predetermined carrier frequencies;

sampling the IF signal to generate a sampled IF signal;

generating a carrier indication signal by processing at least one of the analog IF signal and the sampled IF signal with an FM-capture demodulator;

generating a gain-balanced analog IF signal by controlling the power of at least one of the plurality of information signals based on an average of the carrier indication signal;

generating a sampled gain-balanced IF signal by sampling the gain-balanced analog IF signal; and, demodulating each of the plurality of information signals based on the sampled gain-balanced IF signal with one or more receiver demodulators.

11. The method of claim 10, further comprising:

processing the carrier indication signal to determine whether a magnitude of a first information signal is substantially greater than a magnitude of a second information signal;

providing a control signal to a first attenuator to attenuate the first information signal.

12. The method of claim 10, wherein generating a gain-balanced analog IF signal is also based on a variance of the carrier indication signal.

13. The method of claim 10 wherein the analog IF signal is generated by combining the plurality of information signals through separate downconversion processes, and wherein controlling the power of at least one of the plurality of information signals is performed prior to combining the plurality of information signals.

14. The method of claim 10 wherein the carrier indication signal is generated by a coordinate rotation digital computer operating on the sampled IF signal.

15. The method of claim 10 wherein the wideband phase detector operates on the analog IF signal.

* * * * *